United States Patent
Xu et al.

(10) Patent No.: US 12,238,607 B2
(45) Date of Patent: Feb. 25, 2025

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Yang Xu, Dongguan (CN); Chen Ho Chin, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 351 days.

(21) Appl. No.: 17/813,259

(22) Filed: Jul. 18, 2022

(65) Prior Publication Data
US 2022/0353631 A1 Nov. 3, 2022

Related U.S. Application Data

(63) Continuation of application No. PCT/CN2020/100645, filed on Jul. 7, 2020.

(30) Foreign Application Priority Data

Apr. 3, 2020 (WO) ............... PCT/CN2020/083278

(51) Int. Cl.
*H04W 4/021* (2018.01)
*H04W 4/50* (2018.01)

(52) U.S. Cl.
CPC ............ *H04W 4/021* (2013.01); *H04W 4/50* (2018.02)

(58) Field of Classification Search
None
See application file for complete search history.

(56) References Cited

U.S. PATENT DOCUMENTS

2012/0237028 A1* 9/2012 Khazan ............... G05D 1/0022
380/258
2017/0255194 A1* 9/2017 Poornachandran .... G08G 5/006
(Continued)

FOREIGN PATENT DOCUMENTS

CN 107132852 A 9/2017
CN 107451847 A 12/2017
(Continued)

OTHER PUBLICATIONS

First Office Action from corresponding Chinese Application No. 202210641287.0, dated Jul. 7, 2023 . English translation attached.
(Continued)

*Primary Examiner* — Kenneth B Wells
(74) *Attorney, Agent, or Firm* — Sheppard, Mullin, Richter & Hampton LLP

(57) ABSTRACT

Embodiments of the present disclosure provide a wireless communication method, a terminal device, and a network device. The network device can accurately obtain a service-permitted area and a service-prohibited area for the terminal device based on geo-fencing area information, so that the 3rd Generation Partnership Project (3GPP) network can better serve management and control of the terminal device. The wireless communication method includes: receiving, by a terminal mobility management function entity in a core network, indication first information indicating moving of a terminal device into or out of a first area; and determining, by the terminal management function entity, a service processing for the terminal device based on the indication information.

20 Claims, 8 Drawing Sheets

(56) References Cited

U.S. PATENT DOCUMENTS

| | | | |
|---|---|---|---|
| 2019/0028943 A1 | 1/2019 | Wang et al. | |
| 2019/0182788 A1 | 6/2019 | Lee et al. | |
| 2019/0306757 A1* | 10/2019 | Husain | H04W 4/40 |
| 2021/0166571 A1 | 6/2021 | Zhu et al. | |
| 2021/0259045 A1* | 8/2021 | Prabhakar | G05D 1/0022 |

FOREIGN PATENT DOCUMENTS

| | | | |
|---|---|---|---|
| CN | 107516437 A | 12/2017 | |
| CN | 107959918 A | 4/2018 | |
| CN | 108010063 A | 5/2018 | |
| CN | 108966691 A | 12/2018 | |
| CN | 109983792 A | 7/2019 | |
| CN | 110198520 A | 9/2019 | |
| CN | 110418324 A | 11/2019 | |
| KR | 20110037002 A | 4/2011 | |
| KR | 20180021636 A | 3/2018 | |
| RU | 2321044 C2 | 3/2008 | |
| WO | 2017124003 A1 | 7/2017 | |
| WO | 2018143769 A1 | 8/2018 | |
| WO | 2018146090 A1 | 8/2018 | |
| WO | 2019210962 A1 | 11/2019 | |
| WO | 2020001099 A1 | 1/2020 | |
| WO | 2020033905 A1 | 2/2020 | |
| WO | 2020034748 A1 | 2/2020 | |
| WO | 2020063655 A1 | 4/2020 | |

OTHER PUBLICATIONS

First Office Action from corresponding Russia Application No. RU2022120198, dated May 23, 2023 . English translation attached.

Communication pursuant to Article 94(3) EPC for European application 20929280.4 mailed Jun. 2, 2023.

Extended European Search Report dated Oct. 5, 2022 received in European Patent Application No. EP 20929280.4.

3GPP, "3rd Generation Partnership Project; Technical Specification Group Services and System Aspects; Study on supporting Unmanned Aerial Systems (UAS) connectivity , Identification and tracking (Release 17)" , 3GPP Draft; 23754-020 , 3rd Generation Partnership Project (3GPP) , Mobile Competence Centre ; 650 , Route Des Lucioles ; F-06921 Sophia-Ant Ipolis Cedex France Jul. 2, 2020 (Jul. 2, 2020) , XP051906662.

OPPO: "KI#4: New Solution: Reusing Area Of Interest to support UTM/USS geofencing needs" , 3GPP Draft; S2-2003731 , 3rd Generation Partnership Project (3GPP) , Mobile Competence Centre ; 650 , Route Des Lucioles ; F-06921 Sophia-Ant Ipolis Cedex ; France vol. SA WG2 , No. Elbonia; Jun. 1, 2020-Jun. 12, 2020 May 22, 2020 (May 22, 2020) , XP051889771.

First Examination Report dated Nov. 16, 2022 received in Indian Patent Application No. IN202227032719.

Choi, et al., "Towards Real-Time Data Delivery in oneM2M Platform for UAV Management System", 2019 International Conference on Electronics, Information, and Communication (ICEIC), Jan. 31, 2019; DOI: http://dx.doi.org/10.23919/ELINFOCOM.2019.8706417.

The Grant Notice from corresponding Chinese Application No. CN202210641287.0 dated Sep. 8, 2023. English translation attached.

Communication pursuant to Article 94(3) EPC for European Application 20929280.4 mailed Sep. 25, 2023.

Communication pursuant to Article 94(3) EPC for European application 20929280.4 mailed Feb. 29, 2024.

"3rd Generation Partnership Project; Technical Specification GroupServices and System Aspects, System architecture for the 5G System(5GS);Stage 2(Release 15)",3GPP Draft; 23501-F90,3rd Generation Partnership Projec(3GPP),Mobile Competence Centre ;650, Route Deslucioles :F-06921 Sophia-Antipolis Cedex:France Mar. 27, 2020(Mar. 27, 2020),XP052297822.

Japanese First Office Action with English Translation for JP Application 2022-527883 mailed Mar. 5, 2024.

First Office Action for AU Application 2020440758 mailed Mar. 21, 2024.

International Search Report and Written Opinion dated Jan. 5, 2021 in International Application No. PCT/CN2020/100645. English translation attached.

Qualcomm Incorporated et al."Additional Message Identifier to direct UEs to perform geo-fencing of CMAS messages", 3GPP TSG CT WG1 Meeting #115 C1-191120, Mar. 1, 2019, full text.

International Search Report and Written Opinion dated Dec. 28, 2020 in International Application No. PCT/CN2020/083278. English translation attached.

3rd Generation Partnership Project; Technical Specification Group Services and System Aspects; System architecture for the 5G System (5GS); Stage 2 (Release 16); 3GPP TS 23.501 V16.3.0 (Dec. 2019).

3rd Generation Partnership Project; Technical Specification Group Services and System Aspects; Study on supporting Unmanned Aerial Systems (UAS); connectivity, Identification and tracking (Release 17); 3GPP TR 23.754 V0.1.0 (Jan. 2020).

Decision to Grant a Patent for Japanese Application No. 2022-527883 mailed Jun. 18, 2024.

Communication pursuant to Article 94(3) EPC for European application 20929280.4 mailed Jul. 3, 2024.

The Second Office Action from corresponding Australia Application No. 2020440758, dated Aug. 22, 2024.

* cited by examiner

WIRELESS COMMUNICATION METHOD, TERMINAL DEVICE, AND NETWORK DEVICE

CROSS-REFERENCES TO RELATED APPLICATIONS

The present application is a continuation of International Patent Application No. PCT/CN2020/100645 filed on Jul. 7, 2020 which claims the priority to International Patent Application No. PCT/CN2020/083278 entitled "WIRELESS COMMUNICATION METHOD, TERMINAL DEVICE, AND NETWORK DEVICE" and filed with CNIPA on Apr. 3, 2020, both of which are incorporated herein by reference in their entireties.

FIELD

Embodiments of the present disclosure relate to the field of communication technology, and more particularly, to a wireless communication method, a terminal device, and a network device.

BACKGROUND

With the development of communication technology, more and more machines and devices such as Unmanned Aerial Vehicles (UAVs) can also access the 3rd Generation Partnership Project (3GPP) mobile communication network. Geo-fencing is an important management and control method during the flight of a UAV. Specifically, Unmanned aerial system Traffic Management (UTM) configures geo-fencing information on a UAV side through data interaction at an application layer to take appropriate management and control measures over the UAV. However, since the 3GPP network does not know the existence of the geo-fencing information, it cannot make an accurate judgment on a flight status of the UAV, thereby affecting user experience.

SUMMARY

Embodiments of the present disclosure provide a wireless communication method, a terminal device, and a network device. The network device can accurately obtain a service-permitted area and a service-prohibited area for the terminal device based on geo-fencing area information, so that the 3GPP network can better serve management and control of the terminal device.

In a first aspect, a wireless communication method is provided. The method includes: receiving, by a mobility management function entity, first information. The first information includes geo-fencing area information of a terminal device. The geo-fencing area information indicates a service-permitted area or a list of service-permitted areas for the terminal device, or the geo-fencing area information indicates a service-prohibited area or a list of service-prohibited areas for the terminal device.

In a second aspect, a wireless communication method is provided. The method includes: receiving, by a terminal device, second information transmitted by a mobility management function entity. The second information includes geo-fencing area information of the terminal device. The geo-fencing area information includes a service-permitted area or a list of service-permitted areas for the terminal device, or the geo-fencing area information includes a service-prohibited area or a list of service-prohibited areas for the terminal device.

In a third aspect, a wireless communication method is provided. The method includes: receiving, by a base station, third information transmitted by a mobility management function entity. The third information includes geo-fencing area information of a terminal device. The geo-fencing area information indicates a service-permitted area or a list of service-permitted areas for the terminal device, or the geo-fencing area information indicates a service-prohibited area or a list of service-prohibited areas for the terminal device.

In a fourth aspect, a wireless communication method is provided. The method includes: receiving, by a session management function entity, first indication information transmitted by a mobility management function entity, wherein the first indication information indicates moving of a terminal device into or out of a geo-fencing area, and the geo-fencing area includes a service-permitted area or a list of service-permitted areas for the terminal device, or the geo-fencing area includes a service-prohibited area or a list of service-prohibited areas for the terminal device; and processing, by the session management function entity, a Protocol Data Unit (PDU) session for the terminal device based on the first indication information.

In a fifth aspect, a network device is provided. The network device is configured to perform the method in the first aspect or in each implementation of the first aspect.

Specifically, the network device includes a functional module configured to perform the method in the first aspect or in each implementation of the first aspect.

In a sixth aspect, a terminal device is provided. The terminal device is configured to perform the method in the second aspect or in each implementation of the second aspect.

Specifically, the terminal device includes a functional module configured to perform the method in the second aspect or in each implementation of the second aspect.

In a seventh aspect, a network device is provided. The network device is configured to perform the method in the third aspect or in each implementation of the third aspect.

Specifically, the network device includes a functional module configured to perform the method in the third aspect or in each implementation of the third aspect.

In an eighth aspect, a network device is provided. The network device is configured to perform the method in the fourth aspect or in each implementation of the fourth aspect.

Specifically, the network device includes a functional module configured to perform the method in the fourth aspect or in each implementation of the fourth aspect.

In a ninth aspect, a network device is provided. The network device includes: a memory having a computer program stored thereon; and a processor configured to invoke and execute the computer program stored in the memory to perform the method in the first aspect or in each implementation of the first aspect.

In a tenth aspect, a terminal device is provided. The terminal device includes: a memory having a computer program stored thereon; and a processor configured to invoke and execute the computer program stored in the memory to perform the method in the second aspect or in each implementation of the second aspect.

In an eleventh aspect, a network device is provided. The network device includes: a memory having a computer program stored thereon; and a processor configured to invoke and execute the computer program stored in the memory to perform the method in the third aspect or each implementation of the third aspect.

In a twelfth aspect, a network device is provided. The network device includes: a memory having a computer program stored thereon; and a processor configured to invoke and execute the computer program stored in the memory to perform the method in the fourth aspect or each implementation of the fourth aspect.

In a thirteenth aspect, a device is provided. The device is configured to implement the method in any one of the first aspect to the fourth aspect or in each implementation of any one of the first aspect to the fourth aspect.

Specifically, the device includes a processor configured to invoke and execute a computer program from a memory to cause an apparatus provided with the device to perform the method in any one of the first aspect to the fourth aspect or in each implementation of any one of the first aspect to the fourth aspect.

In a fourteenth aspect, a computer-readable storage medium is provided. The computer-readable storage medium stores a computer program. The computer program causes a computer to perform the method in any one of the first aspect to the fourth aspect or in each implementation of any one of the first aspect to the fourth aspect.

In a fifteenth aspect, a computer program product is provided. The computer program product includes computer program instructions. The computer program instructions cause a computer to perform the method in any one of the first aspect to the fourth aspect or in each implementation of any one of the first aspect to the fourth aspect.

In a sixteenth aspect, a computer program is provided. The computer program, when executed on a computer, causes the computer to perform the method in any one of the first aspect to the fourth aspect or in each implementation of any one of the first aspect to the fourth aspect.

With the above technical solutions, the network device can accurately obtain a service-permitted area and a service-prohibited area for the terminal device based on the geo-fencing area information, so that the 3GPP network can better serve management and control of the terminal device.

DESCRIPTION OF EMBODIMENTS

Technical solutions according to embodiments of the present disclosure will be described below in combination with accompanying drawings of the embodiments of the present disclosure. Obviously, the embodiments described below are only a part of the embodiments of the present disclosure, rather than all of the embodiments. For the embodiments in the present disclosure, all other embodiments obtained by a person skilled in the art without creative labor shall fall within the protection scope of the present disclosure.

The embodiments of the present disclosure can be applied to various communication systems, such as a Global System of Mobile (GSM) communication system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an evolution system of the NR system, an LTE-based access to unlicensed spectrum (LTE-U) system, an NR-based access to unlicensed spectrum (NR-U) system, a Universal Mobile Telecommunication System (UMTS), a Wireless Local Area Network (WLAN), Wireless Fidelity (WiFi), a next-generation of communication system, or other communication systems, etc.

Generally speaking, conventional communication systems support a limited number of connections and are easy to implement. However, with the development of communication technologies, mobile communication systems will not only support conventional communication, but also will support, for example, Device to Device (D2D) communication, Machine to Machine (M2M) communication, Machine Type Communication (MTC), and Vehicle to Vehicle (V2V) communication, etc. The embodiments of the present disclosure can also be applied to these communication systems.

Optionally, the communication system according to the embodiments of the present disclosure may be applied to a Carrier Aggregation (CA) scenario, a Dual Connectivity (DC) scenario, or a Standalone (SA) network deployment scenario.

The embodiments of the present disclosure do not limit a spectrum to which they are applied. For example, the embodiments of the present disclosure may be applied to a licensed spectrum or an unlicensed spectrum.

Figure 1:
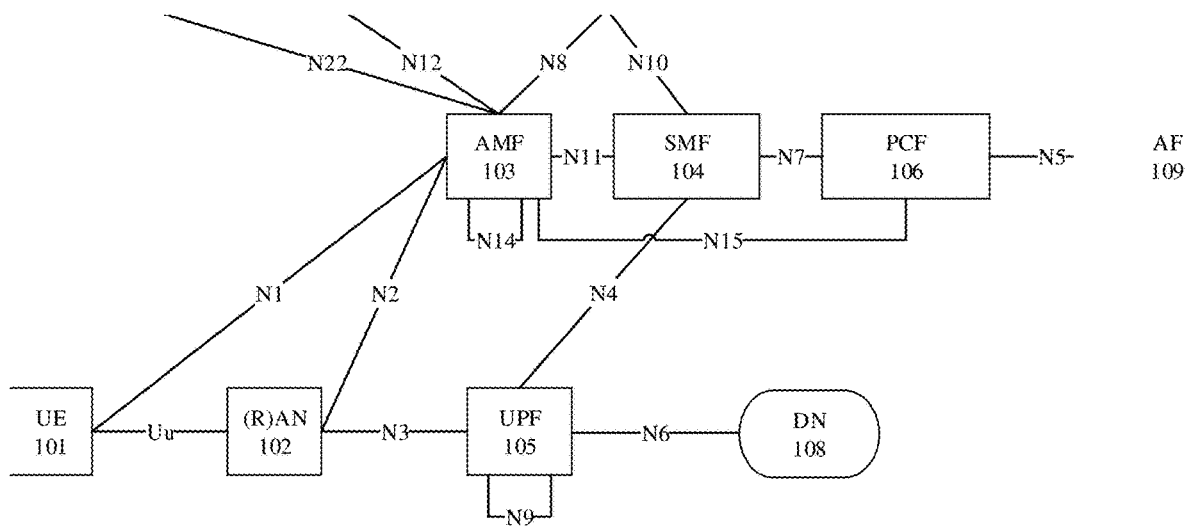
FIG. 1 is a schematic diagram showing a communication system architecture according to an embodiment of the present disclosure.

FIG. 1 exemplarily illustrates a schematic diagram of a communication system 100 applied in the present disclosure. As illustrated in FIG. 1, the communication system 100 mainly includes a terminal device such as User Equipment (UE) 101, an Access Network (AN) device 102, and an Access and Mobility Management Function (AMF) entity 103, a Session Management Function (SMF) entity 104, a User Plane Function (UPF) entity 105, a Policy Control Function (PCF) entity 106, a Unified Data Management (UDM) entity 107, a Data Network (DN) 108, an Application Function (AF) entity 109, an Authentication Server Function (AUSF) entity 110, and a Network Slice Selection Function (NSSF) entity 111.

Specifically, in the communication system 100, the UE 101 establishes an access stratum connection to the AN device 102 via a Uu interface to implement interaction of access stratum messages and wireless data transmission, and establishes a Non-Access Stratum (NAS) connection to the AMF entity 103 via an N1 interface to implement interaction of NAS messages. The AN device 102 is connected to the AMF entity 103 via an N2 interface, and is connected to the UPF entity 105 via an N3 interface. A plurality of UPF entities 105 are connected to each other via an N9 interface. The UPF entity 105 is connected to the DN 108 via an N6 interface, and at the same time, is connected to the SMF entity 104 via an N4 interface. The SMF entity 104 is connected to the PCF entity 106 via an N7 interface, is connected to the UDM entity 107 via an N10 interface, controls the UPF entity 105 via the N4 interface, and at the same time, is connected to the AMF entity 103 via an N11 interface. A plurality of AMF entities 103 are connected to each other via an N14 interface. The AMF entity 103 is connected to the UDM entity 107 via an N8 interface, is connected to the AUSF entity 110 via an N12 interface, is connected to the NSSF entity 111 via an N22 interface, and at the same time, is connected to the PCF entity 106 via an N15 interface. The PCF entity 106 is connected to the AF entity 109 via an N5 interface. The AUSF entity 110 is connected to the UDM entity 107 via an N13 interface.

In the communication system 100, the UDM entity 107 is a subscription database in a core network, and stores subscription data of users in a 5-th Generation (5G) network. The AMF entity 103 is a mobility management function in the core network, and the SMF entity 104 is a session management function in the core network. In addition to mobility management over the UE 101, the AMF entity 103 is also responsible for forwarding messages related to session management between the UE 101 and the SMF entity 104. The PCF entity 106 is a policy management function in the core network, and is responsible for formulating policies related to mobility management, session management, charging, and the like for the UE 101. The UPF entity 105 is a user plane function in the core network, performs data transmission with an external data network via the N6 interface, and performs data transmission with the AN device 102 via the N3 interface. After the UE 101 accesses the 5G network via the Uu interface, a Protocol Data Unit (PDU) session data connection between the UE 101 and the UPF entity 105 is established under the control of the SMF entity 104 to perform data transmission. The AMF entity 103 and the SMF entity 104 obtain user subscription data from the UDM entity 107 via the N8 interface and the N10 interface, respectively, and obtain policy data from the PCF entity 106 via the N15 interface and the N7 interface, respectively.

In addition, the communication system 100 further includes a Network Exposure Function (NEF) entity configured to interface with a server of a third-party application for performing information transmission between nodes of the core network and the third-party application.

It should be noted that the communication system 100 is described by taking a 5G communication system as an example. Of course, the present disclosure can also be applied to other 3GPP communication systems, such as a 4-th Generation (4G) communication system, or a future 3GPP communication system, and the present disclosure is not limited to any of these examples.

It should be understood that, in the embodiments of the present disclosure, a device having a communication function in a network/a system may be referred to as a communication device.

It should be understood that terms "system" and "network" are often used interchangeably herein. The term "and/or" as used herein only represents a relationship between correlated objects, including three relationships. For example, "A and/or B" may mean A only, B only, or both A and B. In addition, the symbol "/" as used herein generally represents an "or" relationship between the correlated objects preceding and succeeding the symbol.

The embodiments of the present disclosure are described in conjunction with a terminal device and a network device. Here, the terminal device may also be referred to as a user equipment, an access terminal, a user unit, a subscriber station, a mobile station, a mobile platform, a remote station, a remote terminal, a mobile device, a user terminal, a terminal, a wireless communication device, a user agent, a user apparatus, etc. The terminal device may be a STATION (ST) in a WLAN, a cellular phone, a cordless phone, a Session Initiation Protocol (SIP) phone, a Wireless Local Loop (WLL) station, a Personal Digital Assistant (PDA) device, a handheld devicesdevice having a wireless communication function, a computing device or other processing devices connected to a wireless modem, a vehicle-mounted device, a wearable device, and a next-generation communication system, e.g., a terminal device in an NR network or a terminal device in a future-evolved Public Land Mobile Network (PLMN) network.

By way of example but not limitation, in the embodiments of the present disclosure, the terminal device may be a wearable device. The wearable device can also be called a wearable smart device, which is a general term for devices that are wearable and developed by applying wearable technology to intelligently design daily wears, such as glasses, gloves, watches, clothing, shoes, etc. A wearable device is a portable device that is worn directly on the body or integrated into a user's clothing or accessory. The wearable device is not only a hardware device, but also realizes powerful functions through software support, data interaction, and cloud interaction. In a broad sense, wearable smart devices include a fully-functioned, large-size device that can achieve all or partial functions without relying on a smart phone, e.g., a smart watch or a pair of smart glasses, and a device that only focuses on a certain type of application function and needs to cooperate with other devices such as a smartphone, e.g., various types of smart bracelets and smart jewelry that monitor physical signs.

The AN device 102 may be a device configured to communicate with a mobile device, such as an Access Point (AP) in a WLAN, a base station such as a Base Transceiver Station (BTS) in a GSM or a CDMA, a base station such as NodeB (NB) in a WCDMA, an evolutional base station such as an Evolutional Node B (eNB or eNodeB) in an LTE, a relay station or an access point, a vehicle-mounted device, a wearable device, a base station such as a gNB in an NR network, a network device in a future-evolved PLMN network, etc.

In the embodiments of the present disclosure, the network device provides services for a cell, a terminal device communicates with the network device through transmission resources (for example, frequency domain resources, or spectrum resources) used by the cell. The cell may be a cell corresponding to the network device (e.g., a base station), and the cell can belong to a macro base station, or a base station corresponding to a small cell. Here, the small cell may include a metro cell, a micro cell, a pico cell, a femto cell, etc. These small cells have characteristics of small coverage and low transmit power, and are suitable for providing high-speed data transmission services.

Figure 2:
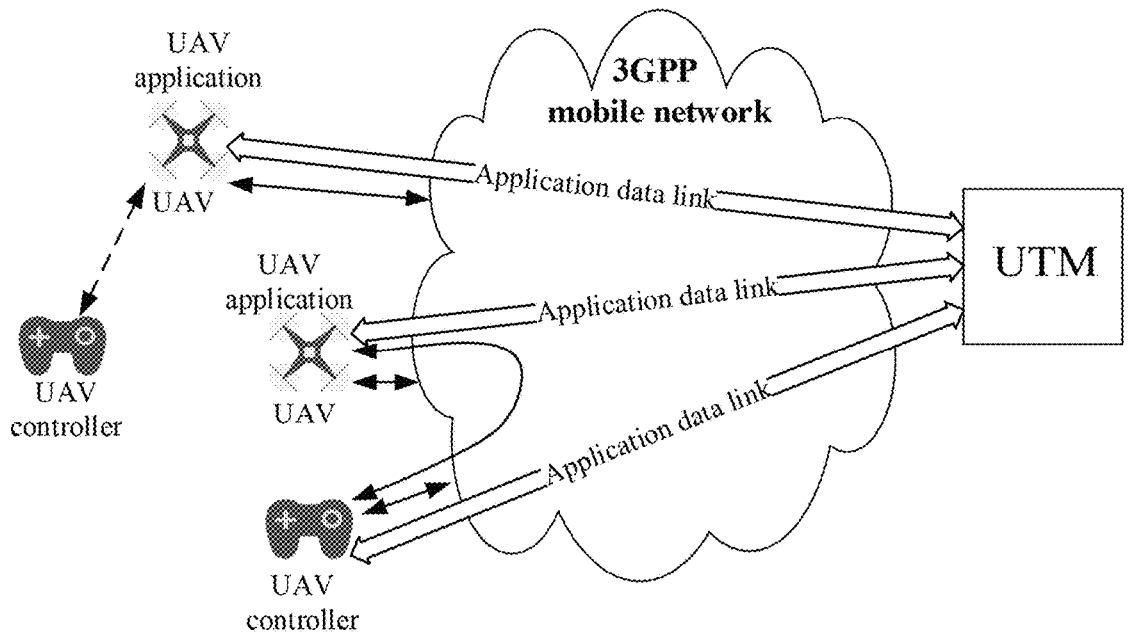
FIG. 2 is a schematic diagram showing UAV management and control according to an embodiment of the present disclosure.

With the development of the mobile communication technology, the terminal device accessing the 3GPP mobile communication network is no longer limited to the terminal device held by people. More and more machines and devices such as UAVs may also become common usage scenarios of a wireless communication network. When accessing the 3GPP network, a device such as a UAV serves as the terminal device. As illustrated in FIG. 2, the UAV, after accessing the 3GPP network, can establish a connection to the UTM through the 3GPP network. The UTM is responsible for registration, position tracking, and other management functions of the UAV, and can control behaviors of the UAV, such as a flight route. After the UAV accesses the 3GPP network, the UAV may also establish a connection to a UAV controller through the 3GPP network so as to allow the UAV controller to control behaviors of the UAV Geo-fencing is an important management and control method during the flight of the UAV. For example, a no-fly zone can be set. The UAV needs to know the coverage of the no-fly zone to avoid flying in the no-fly zone. Once the UAV flies into the no-fly zone, the UTM will take corresponding management and control measures. For example, the UTM may take over the control over the UAV from the UAV controller, to control the UAV to fly away from the no-fly zone, or notify a Third Party Authorized Entity (TPAE) to take over the control or monitoring over the UAV. For example, the TPAE may be a UAV controller belonging to a public security system.

Geo-fencing can be implemented at an application layer. That is, the UTM can configure geo-fencing information on a UAV side through data interaction at the application layer. When the UAV flies into the no-fly zone, the UTM takes corresponding management and control measures, such as withdrawing flight authorization, notifying the TPAE for management and control, and the like. Considering that the UAV accesses the 3GPP network, the setting of the no-fly zone is transparent to the 3GPP network. That is, the 3GPP network does not know an existence of the geo-fencing information, and thus it is possible that a data path of the UAV in normal flight is switched to a network device in the no-fly zone, resulting in an occurrence of UAV signal interruptions. In addition, since the UTM relies on UAV position information provided by the 3GPP network, e.g., an identifier of a cell where the UAV is located in the 3GPP network, to determine an actual position of the UAV, it is also possible that the UTM mistakenly determines the UAV in normal flight as a UAV flying in the no-fly zone, and takes wrong management and control measures.

Based on the above problems, the present disclosure proposes to introduce the concept of a geo-fencing area in the 3GPP network, so that the 3GPP network can obtain geo-fencing area information of the UAV, such as no-fly zone information. The geo-fencing area information of the UAV can be transmitted to a terminal device, a base station, an AMF entity, and an SMF entity in such a manner that the 3GPP network can better serve the management and control of a UAV access.

Figure 3:
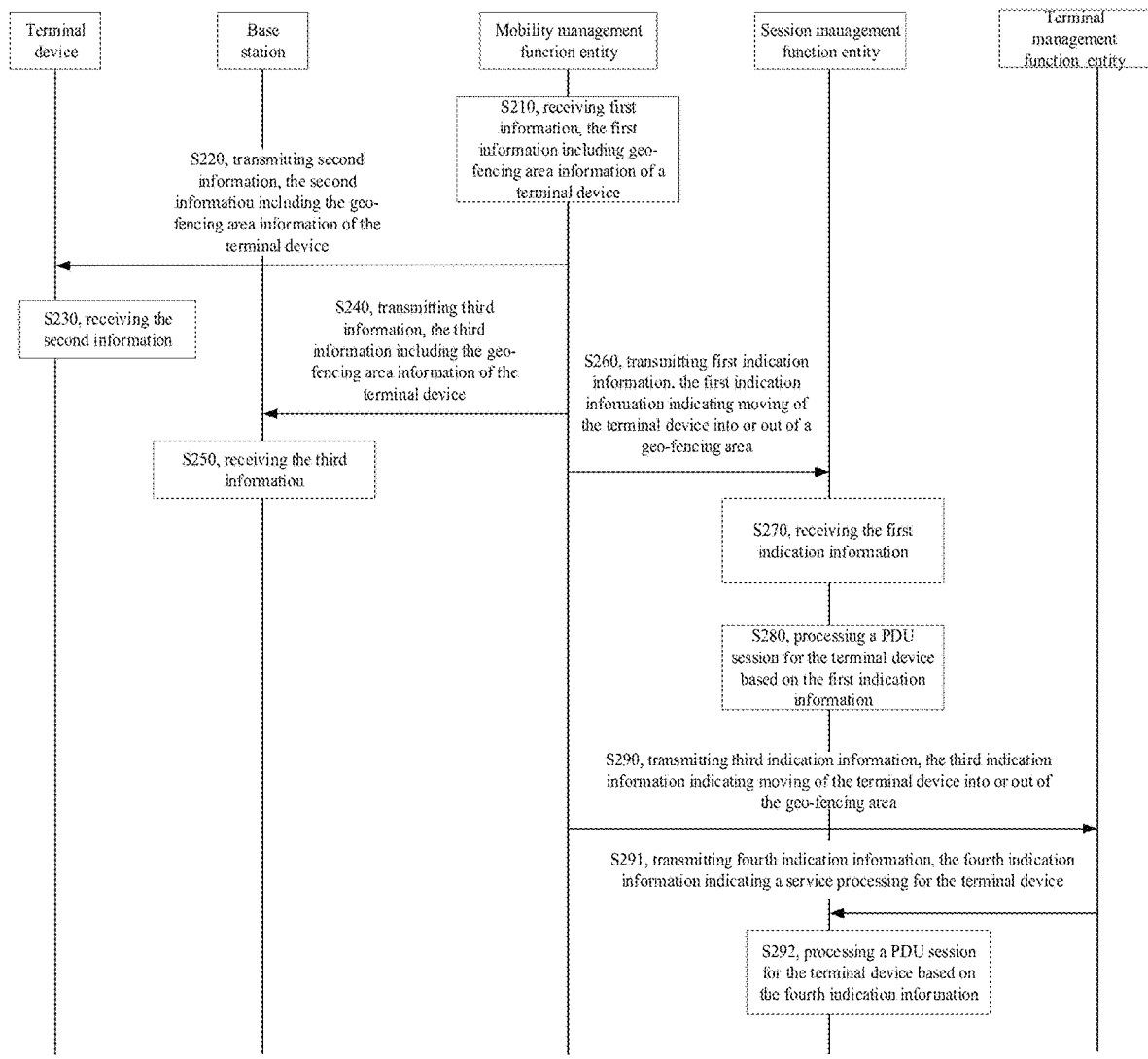
FIG. 3 is a schematical flowchart illustrating a wireless communication method according to an embodiment of the present disclosure.

FIG. 3 is a schematic flowchart illustrating a wireless communication method 200 according to an embodiment of the present disclosure. As illustrated in FIG. 3, the wireless communication method 200 may include, but is not limited to, the following contents.

At S210, a mobility management function entity receives first information. The first information includes geo-fencing area information of a terminal device. The geo-fencing area information indicates a service-permitted area or a list of service-permitted areas for the terminal device, or the geo-fencing area information indicates a service-prohibited area or a list of service-prohibited areas for the terminal device.

At S220, the mobility management function entity transmits second information to the terminal device. The second information includes the geo-fencing area information of the terminal device.

At S230, the terminal device receives the second information.

At S240, the mobility management function entity transmits third information to a base station. The third information includes the geo-fencing area information of the terminal device.

At S250, the base station receives the third information.

At S260, the mobility management function entity transmits first indication information to a session management function entity. The first indication information indicates moving of the terminal device into or out of a geo-fencing area. The geo-fencing area includes a service-permitted area or a list of service-permitted areas for the terminal device, or the geo-fencing area includes a service-prohibited area or a list of service-prohibited areas for the terminal device.

At S270, the session management function entity receives the first indication information.

At S280, the session management function entity processes a PDU session for the terminal device based on the first indication information.

Optionally, at S290, the mobility management function entity transmits third indication information to a terminal management function entity. The third indication information indicates moving of the terminal device into or out of a geo-fencing area. The geo-fencing area includes a service-permitted area or a list of service-permitted areas for the terminal device, or the geo-fencing area includes a service-prohibited area or a list of service-prohibited areas for the terminal device.

At S291, the terminal management function entity determines a service processing for the terminal device based on the received third indication information. For example, the service processing includes, but is not limited to, deleting a session of one IP address or sessions of some IP addresses of the terminal device, deleting one or some service data flows (a service data flow can be identified through means including but not limited to an IP-5 tuple, an IP-3 tuple, and an application identifier) of the terminal device, routing data in the session of one IP address or sessions of some IP addresses of the terminal device to a specific server or another terminal, and routing data of one or some service data flows of the terminal device to a specific server or another terminal. The terminal management function entity transmits the service processing for the terminal device to the session management function entity through fourth indication information.

At S292, the session management function entity processes a corresponding PDU session or a corresponding service data flow for the terminal device based on the fourth indication information.

The mobility management function entity according to the embodiments of the present disclosure may be, for example, an AMF entity in the 5G communication system, and of course, may be an entity having a mobility management function in another 3GPP communication system, and the present disclosure is not limited to any of these examples.

Similarly, the base station according to the embodiments of the present disclosure may be, for example, an AN device or a Radio Access Network (RAN) device or a base station (gNB) in the 5G communication system, and of course, may be a base station in another 3GPP communication system, and the present disclosure is not limited to any of these examples. Similarly, the session management function entity according to the embodiments of the present disclosure may be, for example, an SMF entity in the 5G communication system, and of course, may be an entity having a session management function in another 3GPP communication system, and the present disclosure is not limited to any of these examples.

In the embodiments of the present disclosure, when the geo-fencing area information indicates the service-permitted area or the list of service-permitted areas for the terminal device, an area other than the service-permitted area or the list of service-permitted areas indicated by the geo-fencing area information is regarded as a service-prohibited area; or, when the geo-fencing area information indicates the service-prohibited area or the list of service-prohibited areas for the terminal device, an area other than the service-prohibited area or the list of service-prohibited areas indicated by the geo-fencing area information is regarded as a service-permitted area.

Optionally, the terminal device according to the embodiments of the present disclosure may be an unmanned aerial vehicle device. Alternatively, the terminal device according to the embodiments of the present disclosure may be other types of terminal devices, including other types of machines and devices or common handheld terminal devices. The present disclosure is not limited to any of these examples.

Optionally, the terminal device is an unmanned aerial vehicle device, and the service-permitted area is a permitted flying area, or the service-prohibited area is a no-fly zone.

Optionally, the geo-fencing area according to the embodiments of the present disclosure may specifically be a Tracking Area (TA) list or a cell list in the 3GPP network, geographic position information such as longitude and latitude, a postal code area or an administrative area. Of course, the mobility management function entity needs to transform information such as the latitude and longitude, the postal code area, or the administrative area into a TA or a cell list.

Optionally, in some embodiments, the operation of S210 may specifically be performed as follows: the mobility management function entity receives the first information transmitted by a subscription data management function entity. Subscription information of the terminal device stored by the subscription data management function entity includes the geo-fencing area information.

It should be noted that the subscription data management function entity according to the embodiments of the present disclosure may be, for example, a UDM entity in the 5G communication system, and of course, may be an entity having a subscription data management function in another 3GPP communication system, and the present disclosure is not limited to any of these examples.

Optionally, as an example, the mobility management function entity is an AMF entity, and the subscription data management function entity is a UDM entity. The operation of S210 may specifically be performed as follows: the UDM entity transmits the geo-fencing area information of the terminal device to the AMF entity based on a request from the AMF entity. For example, in a process of initial registration of the terminal device to a network, the AMF entity makes a request to the UDM entity, and then the UDM entity can transmit the geo-fencing area information of the terminal device to the AMF entity based on the request from the AMF entity. For another example, in a periodic registration process of the terminal device, the AMF entity makes a request to the UDM entity, and then the UDM entity can transmit the geo-fencing area information of the terminal device to the AMF entity based on the request from the AMF entity. For yet another example, in a movement-triggered registration process of the terminal device, the AMF entity makes a request to the UDM entity, and then the UDM entity can transmit the geo-fencing area information of the terminal device to the AMF entity based on the request from the AMF entity.

Optionally, as another example, the mobility management function entity is an AMF entity, and the subscription data management function entity is a UDM entity. The operation of S210 may specifically be performed as follows: when the subscription information of the terminal device in the UDM entity changes, the UDM entity actively transmits the geo-fencing area information of the terminal device to the AMF entity.

Optionally, in other embodiments, the operation of S210 may specifically be performed as follows: the mobility management function entity receives the first information transmitted by a policy control function entity.

It should be noted that, the policy control function entity according to the embodiments of the present disclosure may be, for example, a PCF entity in the 5G communication system, and of course, may be an entity having a policy control function in another 3GPP communication system, and the present disclosure is not limited to any of these examples.

Optionally, as an example, the mobility management function entity is an AMF entity, and the policy control function entity is a PCF entity. The operation of S210 may specifically be performed as follows: the PCF entity dynamically adjusts the geo-fencing area information of the terminal device and transmits the adjusted geo-fencing area information to the AMF entity. For example, the PCF entity directly obtains the geo-fencing area information of the terminal device from the UDM entity for adjustment, and transmits the adjusted geo-fencing area information to the AMF entity. For another example, the PCF entity obtains the geo-fencing area information of the terminal device from the AMF entity for adjustment, and transmits the adjusted geo-fencing area information to the AMF entity.

Optionally, in some embodiments, after receiving the geo-fencing area information, the mobility management function entity may further store the geo-fencing area information.

Optionally, in some embodiments, after receiving the geo-fencing area information, the mobility management function entity may determine a geo-fencing area based on the geo-fencing area information, and monitor moving of the terminal device into and/or out of the geo-fencing area.

Optionally, in some embodiments, when monitoring the moving of the terminal device into or out of the geo-fencing area, the mobility management function entity transmits first indication information to a session management function entity and/or a policy control function entity and/or an NEF entity. The first indication information correspondingly indicates the moving of the terminal device into or out of the geo-fencing area.

Regarding the session management function entity, correspondingly, after receiving the first indication information, the session management function entity may process the PDU session for the terminal device based on the first indication information.

Optionally, as an example, after the terminal device enters the service-prohibited area, the session management function entity retains a specific PDU session or a service data flow, and releases other PDU sessions or service data flows. For example, when the terminal device is an unmanned aerial vehicle device, the specific PDU session or the service data flow is a PDU session or a service data flow for data interaction between the UTM or the TPAE and the terminal device.

Optionally, as another example, after the terminal device enters the service-prohibited area, the session management function entity transmits second indication information to a user plane function entity. The second indication information indicates routing a data flow transmitted by the terminal device and/or a data flow destined for the terminal device to an address of a specific application server. For example, when the terminal device is the unmanned aerial vehicle device, the specific application server is the UTM or the TPAE.

Regarding the policy control function entity, correspondingly, after receiving the first indication information, the policy control function entity may further notify the UTM, such that the UTM may perform corresponding management and control measures on the terminal device. The policy control function entity can further modify a control policy in response to the moving of the terminal device into or out of the geo-fencing area. For example, the policy control function entity may delete some service data flows when the terminal device (e.g., the UAV) enters the no-fly zone.

Regarding the NEF entity, correspondingly, after receiving the first indication information, the NEF entity may further notify the UTM, such that the UTM can perform corresponding management and control measures on the terminal device.

Optionally, in some embodiments, the mobility management function entity transmits second information to the terminal device. The second information includes the geo-fencing area information.

It should be noted that, the mobility management function entity may transmit the second information to the terminal device through a Non-Access Stratum (NAS) message.

Optionally, the second information is at least one of the following information for the terminal device: registration acceptance information or configuration update information.

Optionally, in some embodiments, after obtaining the geo-fencing area information, the terminal device performs a cell selection or a cell reselection based on the geo-fencing area information. For example, the terminal device lowers a priority of a cell in the service-prohibited area during the cell selection or the cell reselection.

Optionally, in other embodiments, after obtaining the geo-fencing area information, the terminal device triggers an establishment of a PDU session or a service data flow based on the geo-fencing area information. For example, when a cell where the terminal device is located or a TA is in the service-prohibited area of the geo-fencing area information, the terminal device actively initiates the establishment of the PDU session to a predetermined Access Point Name (APN), or the establishment of the service data flow to a predetermined address.

Optionally, as an example, the mobility management function entity is an AMF entity, and the terminal device is a UAV. Specifically, the AMF entity transmits the geo-fencing area information to the UAV through an NAS message. For example, the geo-fencing area information can be transmitted to the UAV through being carried in a registration acceptance message or an UE configuration update message. The UAV can consider the geo-fencing area information in the subsequent cell selection or cell reselection, such as lowering the priority of the cell in the no-fly zone during the cell selection or the cell reselection, so as to avoid a selection of the cell in the no-fly zone. The UAV can also trigger the establishment of the PDU session or the service data flow based on the geo-fencing area information. For example, when a cell where the UAV is currently located or the TA is located in the no-fly zone of the geo-fencing area information, the UAV actively initiates the establishment of the PDU session to the predetermined APN, or the establishment of the service data flow to a predetermined UTM address.

Optionally, in some embodiments, the mobility management function entity transmits third information to a base station serving the terminal device. The third information includes the geo-fencing area information.

It should be noted that the mobility management function entity may transmit the third information to the base station through an N2 interface message.

Optionally, the third information is at least one of following information for the terminal device: context establishment information, handover request information in a handover process, or information for downlink NAS transmission.

Optionally, after obtaining the geo-fencing area information, the base station stores the geo-fencing area information.

Optionally, after the geo-fencing area information is obtained, and when the terminal device needs to perform a cell handover, the base station selects a target base station or a target cell based on the geo-fencing area information.

For example, the base station preferentially selects a cell located in the service-permitted area as the target cell, and/or the base station refrains from a handover of the terminal device to a cell located in the service-prohibited area.

Optionally, when the terminal device needs to perform the cell handover, and after the target base station is determined, the base station transmits a handover request to the target base station. The handover request carries the geo-fencing area information.

Optionally, as an example, the mobility management function entity is an AMF entity, and the terminal device is a UAV. Specifically, the AMF entity transmits the geo-fencing area information to the base station through an N2 interface message. Specifically, as an example, the geo-fencing area information is carried in a context establishment message initiated for the UAV by the AMF entity to the base station, a handover request message initiated to the target base station in the handover process, or a message transmitted to the base station for downlink NAS transmission. In a subsequent UAV handover process, the base station considers the geo-fencing area information when selecting the target base station or the target cell for the UAV. For example, a cell located in the permitted flying area is preferentially selected to refrain from a handover of the UAV to the cell located in the no-fly zone.

Optionally, in some embodiments, when the terminal device needs a handover from a source base station to a target base station, the mobility management function entity transmits fourth information to a target mobility management function entity. The fourth information includes the geo-fencing area information.

It should be noted that the source base station corresponds to the mobility management function entity, and the target base station corresponds to the target mobility management function entity.

As an example, the mobility management function entity is an AMF entity, and the terminal device is a UAV. Specifically, when a handover is required during movement of the UAV, the geo-fencing area information needs to be transmitted from the source AMF or the source base station to the target AMF or the target base station, so that after a handover from the UAV to the target base station or the target AMF, the target base station or the target AMF can still perform correct geo-fencing control on the UAV.

Therefore, in the embodiments of the present disclosure, the geo-fencing area is introduced into the 3GPP network to enable the 3GPP network to obtain the geo-fencing area information e.g., the no-fly zone information, of the terminal device. The geo-fencing area information of the terminal device can be transmitted to the terminal device, the base station, the AMF entity, and the SMF entity, so that the 3GPP network can better serve access management and control of terminal device (such as the unmanned aerial vehicle device).

The wireless communication method 200 according to the embodiments of the present disclosure will be described in detail below with reference to Embodiment 1 to Embodiment 3.

Embodiment 1

Figure 4:
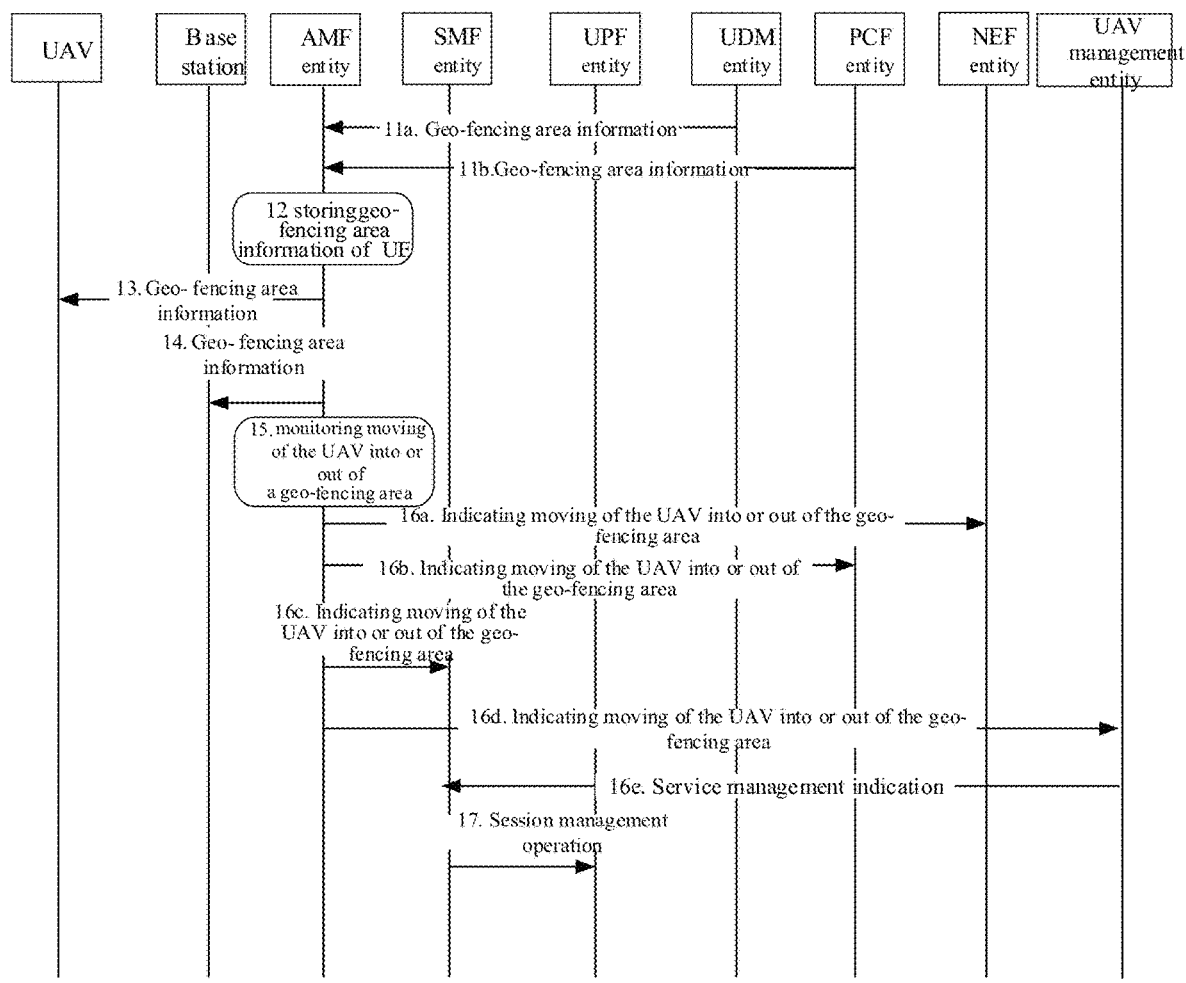
FIG. 4 is a schematical flowchart illustrating a 3GPP network obtaining a geo-fencing area according to an embodiment of the present disclosure.

In Embodiment 1, the 3GPP network can obtain the geo-fencing area of the UAV to better serve access management and control of the UAV. Specifically, as illustrated in FIG. 4, the 3GPP network obtains the geo-fencing area based on step 11 to step 17 described below.

At step 11*a*, subscription information of the UAV stored in the UDM entity includes the geo-fencing area information of the UAV. The geo-fencing area information can be an area or a list of areas where flight of the UAV is allowed. In this case, an area other than the geo-fencing area is regarded as a no-fly zone. Alternatively, the geo-fencing area information may be an area or a list of areas where the flight of the UAV is prohibited. In this case, an area other than the geo-fencing area is regarded as a permitted flying area. The geo-fencing area information may specifically be a TA list or a cell list in the 3GPP network, or may be geographic position information such as longitude and latitude. The UDM entity can transmit the geo-fencing area information of the UAV to the AMF entity based on a request from the AMF entity. For example, the geo-fencing area information can be transmitted to the AMF entity in a process of initial registration of the UAV to the network or in a process of periodic or movement-triggered registration of the UAV, or the geo-fencing area information can be actively transmitted to the AMF entity when the subscription information of the UAV in the UDM entity changes.

At step 11*b*, the PCF entity can dynamically adjust the geo-fencing area information of the UAV and transmit the adjusted geo-fencing area information to the AMF entity. For example, the PCF entity directly obtains the geo-fencing area information of the UAV from the UDM entity for adjustment, or the PCF entity obtains the geo-fencing area information of the UAV from the AMF entity for adjustment.

At step 12, after obtaining the geo-fencing area information of the UAV through step 11*a* or step 11*b*, the AMF entity stores the geo-fencing area information of the UAV.

At step 13, the AMF entity transmits the geo-fencing area information to the UAV through an NAS message. Specifically, for example, the geo-fencing area information may be carried in the registration acceptance message or a UAV configuration update message, and transmitted to the UAV.

The UAV can consider the geo-fencing area information during the subsequent cell selection/cell reselection, such as lowering the priority of a cell in the no-fly zone during the cell selection/the cell reselection, to avoid selecting a cell in the no-fly zone. The UAV can also trigger the establishment of the PDU session or the service data flow based on the geo-fencing area information. For example, when the cell where the UAV is currently located or the TA is located in the no-fly zone of the geo-fencing area information, the UAV actively initiates the establishment of the PDU session to the predetermined APN, or the establishment of the service data flow to the predetermined UTM address.

At step 14, the AMF entity transmits the geo-fencing area information to the base station through an N2 interface message. Specifically, as an example, the geo-fencing area information is carried in a context establishment message initiated for the UAV by the AMF entity to the base station, or a handover request message initiated to a target base station in the handover process, or a message transmitted to the base station for downlink NAS transmission. In the subsequent UAV handover process, the base station considers the geo-fencing area information when selecting the target base station or the target cell for the UAV. For example, the cell located in the permitted flying area is preferentially selected to refrain from the handover of the UAV to the cell located in the no-fly zone.

At step 15, the AMF entity monitors moving of the UAV into and/or out of a geo-fencing area.

Optionally, at step 16*a*, when monitoring the moving of the UAV into or out of the geo-fencing area, the AMF entity can notify the NEF entity of information indicating the moving of the UAV into or out of the geo-fencing area, such that the NEF entity can further notify the UTM for the UTM to implement corresponding management and control measures over the UAV.

Optionally, at step 16*b*, when monitoring the moving of the UAV into or out of the geo-fencing area, the AMF entity can notify the PCF entity of information indicating the moving of the UAV into or out of the geo-fencing area, such that the PCF entity can also further notify the UTM for the UTM to implement corresponding management and control measures over the UAV. The PCF entity can also modify the control policy when the UAV enters or departs from the geo-fencing area. For example, the PCF entity can delete some service data flows when the UAV enters the no-fly zone.

Optionally, at step 16*c*, when monitoring the moving of the UAV into or out of the geo-fencing area, the AMF entity can notify the SMF entity of information indicating the moving of the UAV into or out of the geo-fencing area, such that SMF entity can execute a corresponding PDU session management operation based on the moving of the UAV into or out of the UAV from the geo-fencing area. For example, the SMF entity retains a PDU session or a service data flow for data interaction between the UTM or the TPAE and the UAV, and releases other PDU sessions or service data flows Optionally, at step 16*d*, when monitoring the moving of the UAV into or out of the geo-fencing area, the AMF entity can notify a UAV management entity of information indicating the moving of the UAV into or out of the geo-fencing area, such that the UAV management entity can determine a service processing on the terminal device based on the received notification. For example, the service processing includes, but not limited to, deleting a session of one IP address or sessions of some IP addresses of the UAV, deleting one or some service data flows (a service data flow can be identified through means including but not limited to an IP-5 tuple, an IP-3 tuple, and an application identifier) of the UAV, routing data in the session of one IP address or sessions of some IP addresses of the terminal device to the UTM or the TPAE, and routing data of one or some service data flows of the terminal device to the UTM or the TPAE.

At step 16e, the UAV management entity transmits service management indication of the UAV to the session management function entity.

At step 17, the SMF entity may also indicate the UPF entity to route all data flows transmitted by the UAV or destined for the UAV to the address of the UTM or the TPAE, or process a corresponding PDU session or service data flow for the terminal device based on the indication in step 16e.

Embodiment 2

Figure 5:
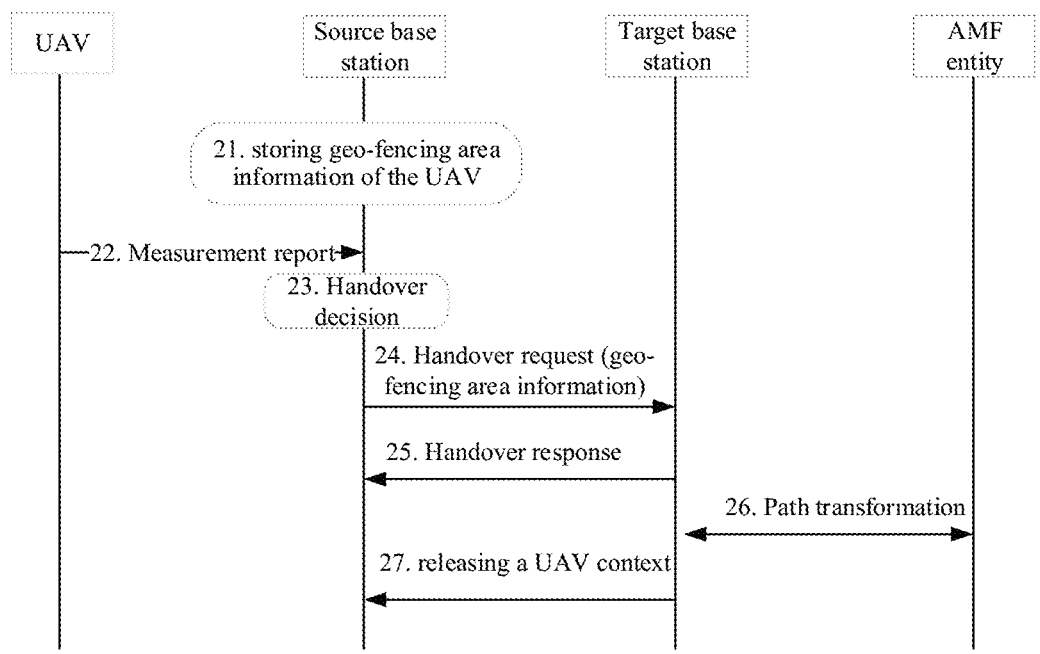
FIG. 5 is another schematical flowchart illustrating a 3GPP network obtaining a geo-fencing area according to an embodiment of the present disclosure.

In Embodiment 2, the 3GPP network can obtain the geo-fencing area of the UAV to better serve the access management and control of the UAV. Specifically, as illustrated in FIG. 5, in a handover scenario, the 3GPP network obtains the geo-fencing area based on step 21 to step 27 described below. Specifically, the source base station and the target base station perform a process of a handover of the UAV through an interface between base stations.

At step 21, the source base station stores the geo-fencing area information of the UAV. A method for the source base station to obtain the geo-fencing area information of the UAV is as described in step 14 in Embodiment 1.

At step 22, the UAV makes a measurement report to the source base station.

At step 23, the source base station determines based on the measurement report that a handover of the UAV to another base station/cell is necessary. When the source base station selects the target base station/the target cell for the UAV, the geo-fencing area information needs to be considered. For example, the cell located in the permitted flying area is preferentially selected to refrain from a handover of the UAV to the cell located in the no-fly zone.

At step 24, after determining the target base station, the source base station transmits a handover request to the target base station. The handover request carries the geo-fencing area information of the UAV.

At step 25, the target base station makes a handover response to the source base station based on its own resource status.

At step 26, after a connection of the UAV to an air interface is transferred from the source base station to the target base station, the target base station notifies the AMF that a handover of the UAV to the target base station has been completed.

At step 27, the target base station notifies the source base station to release a UAV context.

After the handover is completed, the geo-fencing area information of the UAV has been transferred from the source base station to the target base station, so that the target base station can continue to use the geo-fencing area information to make subsequent handover decisions for the UAV. In Embodiment 2, since the AMF entity is not changed, the AMF entity continues using the geo-fencing area information obtained in step 12 in Embodiment 1 to manage and monitor the UAV Embodiment 3

Figure 6:
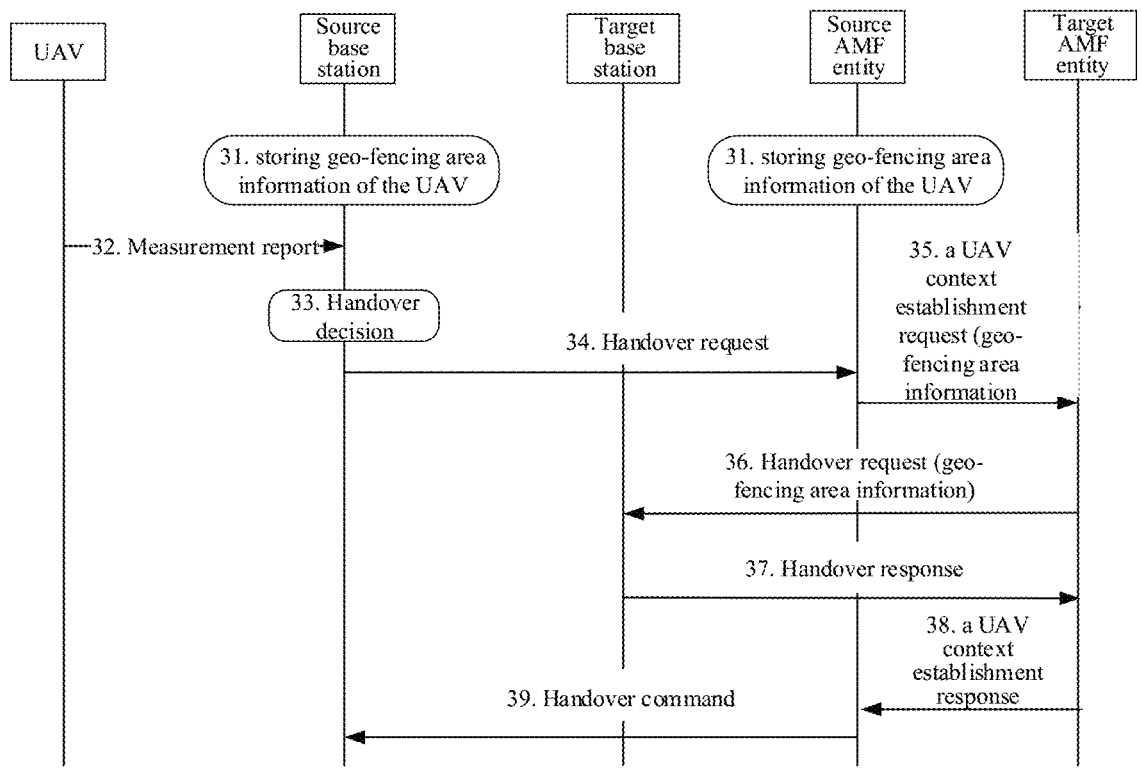
FIG. 6 is a yet another schematical flowchart illustrating a 3GPP network obtaining a geo-fencing area according to an embodiment of the present disclosure.

In Embodiment 3, the 3GPP network can obtain the geo-fencing area of the UAV to better serve access management and control of the UAV. Specifically, as illustrated in FIG. 6, in the handover scenario, the 3GPP network obtains the geo-fencing area of the UAV based on step 31 to step 39 described below. Specifically, during movement of the UAV, a process of the handover of the UAV is performed between the source base station and the target base station through the AMF entity.

At step 31, the source base station and a source AMF entity store the geo-fencing area information of the UAV. A method for the source base station and the source AMF entity to obtain the geo-fencing area information of the UAV is performed as described in step 14 and step 11a or step 11b in Embodiment 1.

Step 32 and step 33 are the same as step 22 and step 23 in Embodiment 2.

At step 34, after determining the target base station, the source base station transmits a handover request to the source AMF entity.

At step 35, the source AMF entity transmits a request for establishing a UAV context to the target AMF entity. The request carries the geo-fencing area information.

At step 36, the target AMF entity transmits a handover request to the target base station. The handover request carries the geo-fencing area information.

At step 37, the target base station makes a handover response to the target AMF entity based on its own resource status.

At step 38, the target AMF entity makes a UAV context establishment response to the source AMF entity.

At step 39, the source AMF entity transmits a handover command to the source base station.

After the handover is completed, the geo-fencing area information of the UAV has been transferred from the source AMF entity to the target AMF entity, and transmitted by the target AMF entity to the target base station, so that the target base station can continue to use the geo-fencing area information to make subsequent handover decisions for the UAV. The target AMF entity can also continue to use the geo-fencing area information to manage and monitor the UAV.

Method embodiments of the present disclosure are described in detail above with reference to FIG. 3 to FIG. 6, and apparatus embodiments of the present disclosure will be described in detail below with reference to FIG. 7 to FIG. 13. It should be understood that the apparatus embodiments correspond to the method embodiments, and similar description of the apparatus embodiments can refer to the method embodiments.

Figure 7:
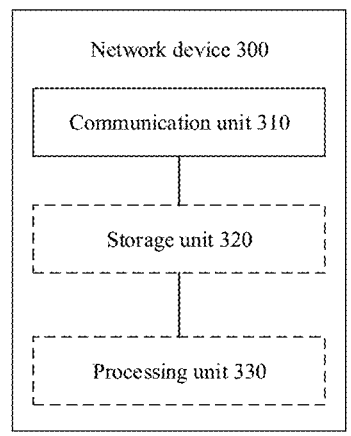
FIG. 7 is a schematic block diagram showing a network device according to an embodiment of the present disclosure.

FIG. 7 illustrates a schematic block diagram of a network device 300 according to an embodiment of the present disclosure. The network device 300 is a mobility management function entity. As illustrated in FIG. 7, the network device 300 includes a communication unit 310.

The communication unit 310 is configured to receive first information. The first information includes geo-fencing area information of a terminal device. The geo-fencing area information indicates a service-permitted area or a list of service-permitted areas for the terminal device, or the geo-fencing area information indicates a service-prohibited area or a list of service-prohibited areas for the terminal device.

Optionally, the communication unit 310 is specifically configured to receive the first information transmitted by a subscription data management function entity. Subscription information of the terminal device stored by the subscription data management function entity includes the geo-fencing area information.

Optionally, the communication unit 310 is specifically configured to receive the first information transmitted by a policy control function entity.

Optionally, the network device 300 further includes a storage unit 320 configured to store the geo-fencing area information.

Optionally, the network device 300 further includes a processing unit 330 configured to monitor moving of the terminal device into and/or out of a geo-fencing area. The geo-fencing area is determined based on the geo-fencing area information.

Optionally, the communication unit 310 is further configured to transmit first indication information to a session management function entity and/or a policy control function entity and/or a network exposure function entity. The first indication information indicate the moving of the terminal device into or out of the geo-fencing area.

Optionally, the communication unit 310 is further configured to transmit second information to the terminal device. The second information includes the geo-fencing area information.

Optionally, the second information is at least one of following information for the terminal device: registration acceptance information or configuration update information.

Optionally, the communication unit 310 is further configured to transmit third information to a base station serving the terminal device. The third information includes the geo-fencing area information.

Optionally, the third information is at least one of following information for the terminal device: context establishment information, handover request information in a handover process, or information for downlink NAS transmission.

Optionally, when the terminal device needs a handover from a source base station to a target base station, the communication unit 310 is configured to transmit fourth information to a target mobility management function entity. The fourth information includes the geo-fencing area information.

Optionally, when the geo-fencing area information indicates the service-permitted area or the list of service-permitted areas for the terminal device, an area other than the service-permitted area or the list of service-permitted areas indicated by the geo-fencing area information is regarded as a service-prohibited area; or when the geo-fencing area information indicates the service-prohibited area or the list of service-prohibited areas for the terminal device, an area other than the service-prohibited area or the list of service-prohibited areas indicated by the geo-fencing area information is regarded as a service-permitted area.

Optionally, the terminal device is an unmanned aerial vehicle device, and the service-permitted area is a permitted flying area, or the service-prohibited area is a no-fly zone.

Optionally, in some embodiments, the communication unit may be a communication interface or a transceiver, or an input/output interface of a communication chip or a system-on-chip. The processing unit may be one or more processors.

It should be understood that the network device 300 according to the embodiments of the present disclosure may correspond to the mobility management function entity in the method embodiments of the present disclosure, and the above and other operations and/or functions of each unit in the network device 300 are respectively intended to implement corresponding procedures of the mobility management function entity in the method 200 illustrated in FIG. 3. For brevity, details thereof will be omitted herein.

Figure 8:
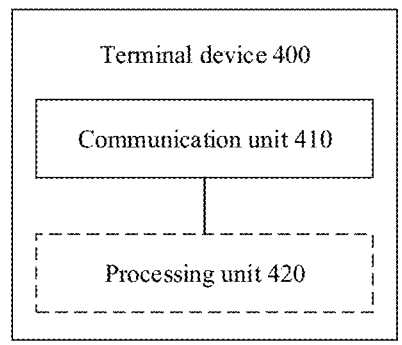
FIG. 8 is a schematic block diagram showing a terminal device according to an embodiment of the present disclosure.

FIG. 8 illustrates a schematic block diagram of a terminal device 400 according to an embodiment of the present disclosure. As illustrated in FIG. 8, the terminal device 400 includes a communication unit 410.

The communication unit 410 is configured to receive second information transmitted by a mobility management function entity. The second information includes geo-fencing area information of the terminal device. The geo-fencing area information includes a service-permitted area or a list of service-permitted areas for the terminal device, or the geo-fencing area information includes a service-prohibited area or a list of service-prohibited areas for the terminal device.

Optionally, when the geo-fencing area information indicates the service-permitted area or the list of service-permitted areas for the terminal device, an area other than the service-permitted area or the list of service-permitted areas indicated by the geo-fencing area information is regarded as a service-prohibited area; or when the geo-fencing area information indicates the service-prohibited area or the list of service-prohibited areas for the terminal device, an area other than the service-prohibited area or the list of service-prohibited areas indicated by the geo-fencing area information is regarded as a service-permitted area.

Optionally, the terminal device 400 further includes a processing unit 420 configured to perform a cell selection or a cell reselection based on the geo-fencing area information.

Optionally, the processing unit 420 is specifically configured to lower a priority of a cell in the service-prohibited area during the cell selection or the cell reselection.

Optionally, the processing unit 420 is further configured to trigger an establishment of a PDU session or a service data flow based on the geo-fencing area information.

Optionally, the processing unit 420 is specifically configured to actively initiate, when a cell where the terminal device is located or a TA is in the service-prohibited area of the geo-fencing area information, the establishment of the PDU session to a predetermined APN, or the establishment of the service data flow to a predetermined address.

Optionally, the second information is at least one of following information for the terminal device: registration acceptance information or configuration update information.

Optionally, the terminal device is an unmanned aerial vehicle device, and the service-permitted area is a permitted flying area, or the service-prohibited area is a no-fly zone.

Optionally, in some embodiments, the communication unit may be a communication interface or a transceiver, or an input/output interface of a communication chip or a system-on-chip. The processing unit may be one or more processors.

It should be understood that the terminal device 400 according to the embodiments of the present disclosure may correspond to the terminal device in the method embodiments of the present disclosure, and the above and other operations and/or functions of each unit in the terminal device 400 are respectively intended to implement corresponding procedures of the terminal device in the method 200 illustrated in FIG. 3. For brevity, details thereof will be omitted herein.

Figure 9:
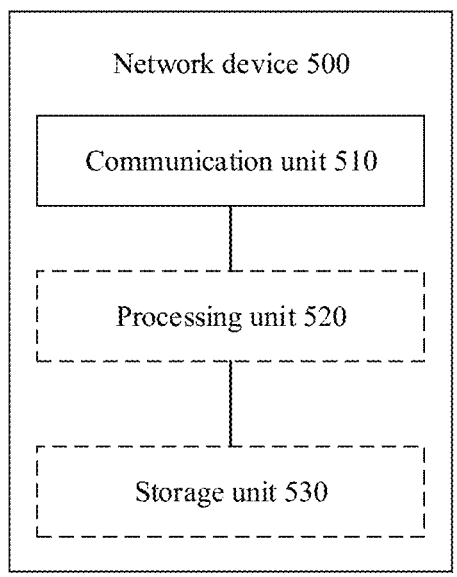
FIG. 9 is another schematic block diagram showing a network device according to an embodiment of the present disclosure.

FIG. 9 illustrates a schematic block diagram of a network device 500 according to an embodiment of the present disclosure. The network device 500 is a base station. As illustrated in FIG. 9, the network device 500 includes a communication unit 510.

The communication unit 510 is configured to receive third information transmitted by a mobility management function entity. The third information includes geo-fencing area information of a terminal device. The geo-fencing area information indicates a service-permitted area or a list of service-permitted areas for the terminal device, or the geo-fencing area information indicates a service-prohibited area or a list of service-prohibited areas for the terminal device.

Optionally, when the geo-fencing area information indicates the service-permitted area or the list of service-permitted areas for the terminal device, an area other than the service-permitted area or the list of service-permitted areas indicated by the geo-fencing area information is regarded as a service-prohibited area; or when the geo-fencing area information indicates the service-prohibited area or the list of service-prohibited areas for the terminal device, an area other than the service-prohibited area or the list of service-prohibited areas indicated by the geo-fencing area information is regarded as a service-permitted area.

Optionally, the network device 500 further includes a processing unit 520 configured to select, when the terminal device needs to perform a cell handover, a target base station or a target cell based on the geo-fencing area information.

Optionally, the processing unit 520 is specifically configured to preferentially select a cell located in the service-permitted area as the target cell, and/or refrain from a handover of the terminal device to a cell located in the service-prohibited area.

Optionally, after the target base station is determined, the communication unit 510 is further configured to transmit a handover request to the target base station. The handover request carries the geo-fencing area information.

Optionally, the network device 500 further includes a storage unit 530 configured to store the geo-fencing area information.

Optionally, the third information is at least one of following information for the terminal device: context establishment information, handover request information in a handover process, or information for downlink NAS transmission.

Optionally, the terminal device is an unmanned aerial vehicle device, and the service-permitted area is a permitted flying area, or the service-prohibited area is a no-fly zone.

Optionally, in some embodiments, the communication unit may be a communication interface or a transceiver, or an input/output interface of a communication chip or a system-on-chip. The processing unit may be one or more processors.

It should be understood that the network device 500 according to the embodiments of the present disclosure may correspond to the network device in the method embodiments of the present disclosure, and the above and other operations and/or functions of each unit in the network device 500 are respectively intended to implement corresponding procedures of the network device in the method 200 illustrated in FIG. 3. For brevity, details thereof will be omitted herein.

Figure 10:
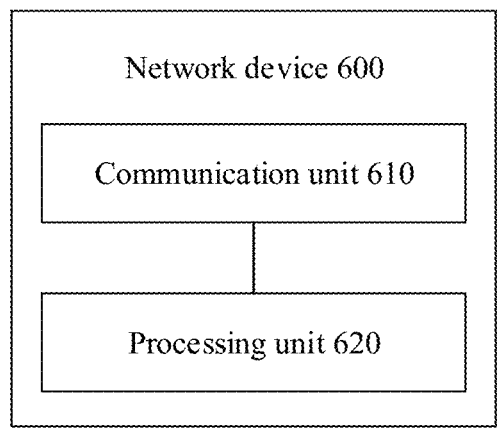
FIG. 10 is yet another schematic block diagram showing a network device according to an embodiment of the present disclosure.

FIG. 10 illustrates a schematic block diagram of a network device 600 according to an embodiment of the present disclosure. The network device 600 is a session management function entity. As illustrated in FIG. 10, the network device 600 includes a communication unit 610 and a processing unit 620.

The communication unit 610 is configured to receive first indication information transmitted by a mobility management function entity. The first indication information indicates moving of a terminal device into or out of a geo-fencing area. The geo-fencing area includes a service-permitted area or a list of service-permitted areas for the terminal device, or the geo-fencing area includes a service-prohibited area or a list of service-prohibited areas for the terminal device.

The processing unit 620 is configured to process a PDU session for the terminal device based on the first indication information.

Optionally, when the geo-fencing area includes the service-permitted area or the list of service-permitted areas for the terminal device, an area other than the geo-fencing area is regarded as a service-prohibited area; or when the geo-fencing area includes the service-prohibited area or the list of service-prohibited areas for the terminal device, an area other than the geo-fencing area is regarded as a service-permitted area.

Optionally, the processing unit 620 is specifically configured to retain a specific PDU session or a service data flow, and release other PDU sessions or service data flows after the terminal device enters the service-prohibited area.

Optionally, when the terminal device is an unmanned aerial vehicle device, the specific PDU session or the service data flow is used for data interaction between UTM or a TPAE and the terminal device.

Optionally, after the terminal device enters the service-prohibited area, the communication unit 610 is further configured to transmit second indication information to a user plane function entity. The second indication information indicates routing a data flow transmitted by the terminal device and/or a data flow destined for the terminal device to an address of a specific application server.

Optionally, when the terminal device is an unmanned aerial vehicle device, the specific application server is UTM or a TPAE.

Optionally, the terminal device is an unmanned aerial vehicle device, and the service-permitted area is a permitted flying area, or the service-prohibited area is a no-fly zone.

Optionally, in some embodiments, the communication unit may be a communication interface or a transceiver, or an input/output interface of a communication chip or a system-on-chip. The processing unit may be one or more processors.

It should be understood that the network device 600 according to the embodiments of the present disclosure may correspond to the network device in the method embodiments of the present disclosure, and the above and other operations and/or functions of each unit in the network device 600 are respectively intended to implement corresponding procedures of the network device in the method 200 illustrated in FIG. 3. For brevity, details thereof will be omitted herein.

Figure 11:
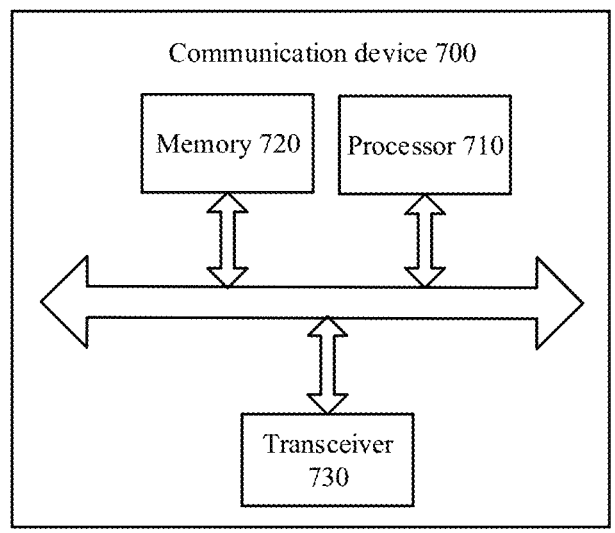
FIG. 11 is a schematic block diagram showing a communication device according to an embodiment of the present disclosure.

FIG. 11 is a schematic diagram showing a structure of a communication device 700 according to an embodiment of the present disclosure. The communication device 700 illustrated in FIG. 11 includes a processor 710. The processor 710 is configured to invoke and run a computer program from a memory to perform the method according to any of the embodiments of the present disclosure.

Optionally, as illustrated in FIG. 11, the communication device 700 may further include a memory 720. The processor 710 may invoke and run a computer program from the memory 720 to perform the method according to any of the embodiments of the present disclosure.

Here, the memory 720 may be a separate component independent of the processor 710, or may be integrated in the processor 710.

Optionally, as illustrated in FIG. 11, the communication device 700 may further include a transceiver 730. The processor 710 may control the transceiver 730 to communicate with other devices, specifically, to transmit information or data to other devices, or receive information or data transmitted by other devices.

Here, the transceiver 730 may include a transmitter and a receiver. The transceiver 730 may further include one or more antennas.

Optionally, the communication device 700 may specifically be a network device according to an embodiment of the present disclosure. The communication device 700 may execute corresponding processes implemented by the network device in the method according to any of the embodiments of the present disclosure. For brevity, details thereof will be omitted herein.

Optionally, the communication device 700 may specifically be the mobile terminal/terminal device according to any of the embodiments of the present disclosure. The communication device 700 may implement corresponding processes implemented by the mobile terminal/terminal device in the method according to any of the embodiments of the present disclosure. For brevity, details thereof will be omitted herein.

Figure 12:
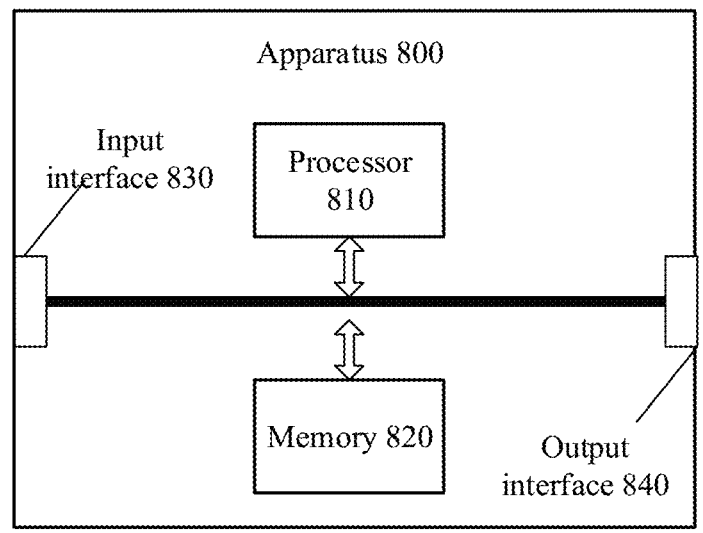
FIG. 12 is a schematic block diagram showing an apparatus according to an embodiment of the present disclosure.

FIG. 12 is a schematic diagram showing a structure of an apparatus according to an embodiment of the present disclosure. An apparatus 800 illustrated in FIG. 12 includes a processor 810. The processor 810 can invoke and run a computer program from a memory to perform the method according to any of the embodiments of the present disclosure.

Optionally, as illustrated in FIG. 12, the apparatus 800 may further include a memory 820. The processor 810 may invoke and run a computer program from the memory 820 to perform the method according to any of the embodiments of the present disclosure.

Here, the memory 820 may be a separate component independent of the processor 810, or may be integrated in the processor 810.

Optionally, the apparatus 800 may further include an input interface 830. The processor 810 can control the input interface 830 to communicate with other devices or chips, specifically, to obtain information or data transmitted by other devices or chips.

Optionally, the apparatus 800 may further include an output interface 840. The processor 810 can control the output interface 840 to communicate with other devices or chips, specifically, to output information or data to other devices or chips.

Optionally, the apparatus can be applied to the network device according to any of the embodiments of the present disclosure. In addition, the apparatus can implement corresponding processes implemented by the network device in the method according to any of the embodiments of the present disclosure. For brevity, details thereof will be omitted herein.

Optionally, the apparatus can be applied to the mobile terminal/terminal device according to any of the embodiments of the present disclosure. The apparatus can implement corresponding processes implemented by the mobile terminal/terminal device in the method according to any of the embodiments of the present disclosure. For brevity, details thereof will be omitted herein.

Optionally, the apparatus mentioned in the embodiments of the present disclosure may a chip. For example, the chip may be a system-level chip, a system-chip, a chip system, or a system-on-chip.

Figure 13:
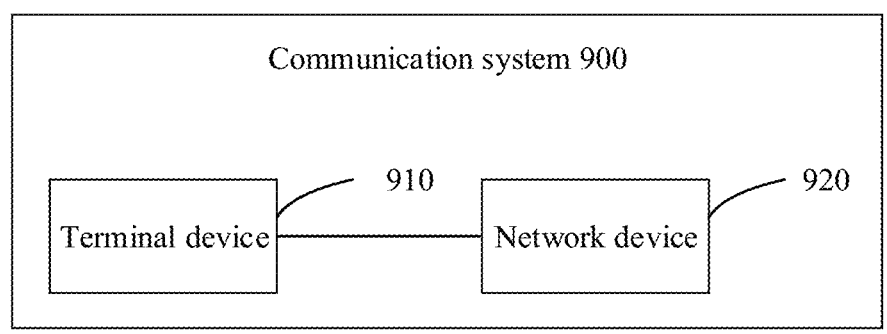
FIG. 13 is a schematic block diagram showing a communication system according to an embodiment of the present disclosure.

FIG. 13 is a schematic block diagram of a communication system 900 according to an embodiment of the present disclosure. As illustrated in FIG. 13, the communication system 900 includes a terminal device 910 and a network device 920.

Here, the terminal device 910 can be configured to implement the corresponding functions implemented by the terminal device in the above methods. The network device 920 can be configured to implement corresponding functions implemented by at least one of the mobility management function entity, the base station, or the session management function entity in the above methods. For brevity, details thereof will be omitted herein.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The above processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or the processor and may be any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as a Random Access Memory (RAM), a flash memory, a Read-Only Memory (ROM), a Programmable ROM, an electrically erasable programmable memory, or a register. The storage medium can be located in the memory, and the processor can read information from the memory and perform the steps of the above methods in combination with its hardware.

It can be appreciated that the memory in the embodiments of the present disclosure may be a transitory memory or a non-transitory memory, or may include both transitory and non-transitory memories. Here, the non-transitory memory may be an ROM, a Programmable ROM (PROM), an Erasable PROM (EPROM), an Electrically EPROM (EEPROM), or a flash memory. The transitory memory may be an RAM, which is used as an external cache. As illustrative, rather than limiting, many forms of RAMs are available, including for example Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer-readable storage medium for storing a computer program.

Optionally, the computer-readable storage medium can be applied to the network device in the embodiment of the present disclosure, and the computer program can cause a computer to perform corresponding procedures implemented by the network device in the method according to any of the embodiments of the present disclosure. For brevity, description thereof is omitted herein.

Optionally, the computer-readable storage medium can be applied to the mobile terminal/terminal device in the embodiment of the present disclosure, and the computer program can cause a computer to perform corresponding procedures implemented by the mobile terminal/terminal device in the method according to any of the embodiments of the present disclosure. For brevity, description thereof is omitted herein.

An embodiment of the present disclosure also provides a computer program product including computer program instructions.

Optionally, the computer program product can be applied to the network device in the embodiment of the present disclosure, and the computer program instructions can cause a computer to perform corresponding procedures implemented by the network device in the method according to any of the embodiments of the present disclosure. For brevity, details thereof will be omitted here.

Optionally, the computer program product can be applied to the mobile terminal/terminal device in the embodiment of the present disclosure, and the computer program instructions can cause a computer to perform corresponding procedures implemented by the mobile terminal/terminal device in the method according to any of the embodiments of the present disclosure. For brevity, details thereof will be omitted here.

An embodiment of the present disclosure also provides a computer program.

Optionally, the computer program can be applied to the network device in the embodiment of the present disclosure. The computer program, when executed on a computer, can cause the computer to perform corresponding procedures implemented by the network device in each method according to the embodiments of the present disclosure. For brevity, details thereof will be omitted here.

Optionally, the computer program can be applied to the mobile terminal/terminal device in the embodiment of the present disclosure. The computer program, when executed on a computer, can cause the computer to perform corresponding procedures implemented by the mobile terminal/terminal device in the method according to any of the embodiments of the present disclosure. For brevity, details thereof will be omitted here.

It can be appreciated by those skilled in the art that units and algorithm steps in the examples described in connection to the embodiments disclosed herein can be implemented in an electronic hardware or any combination of a computer software and an electronic hardware. Whether these functions are executed by a hardware or a software depends on specific applications and design constraint conditions of the technical solutions. Those skilled in the art may use different methods for each specific application to implement the described functions, and such implementation is to be encompassed by the scope of the present disclosure.

Those skilled in the art can clearly understand that, for the convenience and conciseness of the description, for the specific operation processes of the systems, apparatuses, and units described above, reference can be made to the corresponding processes in the above method embodiments, and details thereof will be omitted here.

In the embodiments of the present disclosure, it can be appreciated that the disclosed systems, apparatuses, and methods may be implemented in other ways. For example, the apparatus embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between apparatuses or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer-readable storage medium. Based on this understanding, all or part of the technical solutions according to the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include various mediums capable of storing program codes, such as a Universal Serial Bus flash drive, a mobile hard disk, an ROM, an RAM, a magnetic disk, or an optical disc.

While the specific embodiments of the present disclosure have been described above, the protect scope of the present disclosure is not limited to these embodiments. Various variants and alternatives can be easily conceived by any of those skilled in the art without departing from the technical scope of the present disclosure. Therefore, these variants and alternatives are to be encompassed by the protect scope of present disclosure as defined by the claims as attached.

What is claimed is:

1. A wireless communication method, comprising:
   receiving, by a terminal management function entity in a core network, first indication information transmitted by a mobility management function entity, the first indication information indicating moving of a terminal device into or out of a first area, the mobility management function entity being an Access and Mobility Management Function (AMF) entity;
   determining, by the terminal management function entity, a service processing for the terminal device based on the first indication information; and
   transmitting, by the terminal management function entity, second indication information indicating the service processing to a session management function entity, wherein the service processing comprises deleting one or more service data flows of the terminal device, and the one or more service data flows are identified through at least one of an IP-5 tuple, an IP-3 tuple, or an application identifier.

2. The method according to claim 1, wherein the service processing further comprises at least one of:
deleting a Protocol Data Unit (PDU) session of one IP address or PDU sessions of multiple IP addresses of the terminal device,
routing data in a PDU session of one IP address or PDU sessions of multiple IP addresses of the terminal device to a server or another terminal device, or
routing data of one or more service data flows of the terminal device to a server or another terminal device.

3. The method according to claim 1, wherein the first area is a Tracking Area (TA) list or a cell list in a 3GPP network, geographic position information, a postal code area or an administrative area.

4. The method according to claim 1, wherein
the terminal device is an Unmanned Aerial Vehicle (UAV) device, and
the terminal management function entity is a UAV management entity.

5. A non-transitory computer-readable storage medium, having a computer program stored thereon, wherein the computer program causes a computer to perform the wireless communication method according to claim 1.

6. The non-transitory computer-readable storage medium according to claim 5, wherein the first area is a Tracking Area (TA) list or a cell list in a 3 GPP network, geographic position information, a postal code area or an administrative area.

7. A wireless communication method, comprising:
receiving, by a session management function entity from a terminal management function entity in a core network, second indication information indicating a service processing for the terminal device, the service processing being determined by the terminal management function entity based on first indication information received from a mobility management function entity, the first indication information indicating moving of a terminal device into or out of a first area, and the mobility management function entity being an Access and Mobility Management Function (AMF) entity; and
performing, by the session management function entity, the service processing on the terminal device based on the second indication information received from the terminal management function,
wherein the service processing comprises deleting one or more service data flows of the terminal device, and the one or more service data flows are identified through at least one of an IP-5 tuple, an IP-3 tuple, or an application identifier.

8. The method according to claim 7, wherein the service processing further comprises at least one of:
deleting a Protocol Data Unit (PDU) session of one IP address or PDU sessions of multiple IP addresses of the terminal device,
routing data in a PDU session of one IP address or PDU sessions of multiple IP addresses of the terminal device to a server or another terminal device, or
routing data of one or more service data flows of the terminal device to a server or another terminal device.

9. A network device, comprising:
a memory having a computer program stored thereon; and
a processor configured to invoke and execute the computer program stored in the memory to perform the wireless communication method according to claim 7.

10. The network device according to claim 9, wherein the service processing further comprises at least one of:
deleting a Protocol Data Unit (PDU) session of one IP address or PDU sessions of multiple IP addresses of the terminal device,
routing data in a PDU session of one IP address or PDU sessions of multiple IP addresses of the terminal device to a server or another terminal device, or
routing data of one or more service data flows of the terminal device to a server or another terminal device.

11. A non-transitory computer-readable storage medium, having a computer program stored thereon, wherein the computer program causes a computer to perform the wireless communication method according to claim 7.

12. The method according to claim 7, wherein the first area is a Tracking Area (TA) list or a cell list in a 3GPP network, geographic position information, a postal code area or an administrative area.

13. The method according to claim 7, wherein the terminal device is an Unmanned Aerial Vehicle (UAV) device, and the terminal management function entity is a UAV management entity.

14. The network device according to claim 9, wherein the first area is a Tracking Area (TA) list or a cell list in a 3 GPP network, geographic position information, a postal code area or an administrative area.

15. The network device according to claim 9, wherein the terminal device is an Unmanned Aerial Vehicle (UAV) device, and the terminal management function entity is a UAV management entity.

16. A network device, comprising:
a memory having a computer program stored therein; and
a processor configured to invoke and execute the computer program stored in the memory to:
receive first indication information transmitted by a mobility management function entity in a core network, the first indication information indicating moving of a terminal device into or out of a first area, the mobility management function entity being an Access and Mobility Management Function (AMF) entity;
determine a service processing for the terminal device based on the first indication information; and
transmit second indication information indicating the service processing to a session management function entity,
wherein the service processing comprises deleting one or more service data flows of the terminal device, and the one or more service data flows are identified through at least one of an IP-5 tuple, an IP-3 tuple, or an application identifier.

17. The network device according to claim 16, wherein the service processing further comprises at least one of:
deleting a Protocol Data Unit (PDU) session of one IP address or PDU sessions of multiple IP addresses of the terminal device,
routing data in a PDU session of one IP address or PDU sessions of multiple IP addresses of the terminal device to a server or another terminal device, or
routing data of one or more service data flows of the terminal device to a server or another terminal device.

18. The network device according to claim 16, wherein the first area is a Tracking Area (TA) list or a cell list in a 3GPP network, geographic position information, a postal code area or an administrative area.

19. The network device according to claim 16, wherein the first area is a Tracking Area (TA) list or a cell list in a 3 GPP network, geographic position information, a postal code area or an administrative area.

20. The network device according to claim 16, wherein the terminal device is an Unmanned Aerial Vehicle (UAV) device, and the terminal management function entity is a UAV management entity.

* * * * *